Patented Feb. 1, 1927.

1,616,250

UNITED STATES PATENT OFFICE.

HARRY PRESTON BASSETT, OF PHILADELPHIA, PENNSYLVANIA, ASSIGNOR TO ELECTRO COMPANY, OF ODESSA, DELAWARE, A CORPORATION OF DELAWARE.

PROCESS OF PURIFYING SALT CRYSTALS FROM IRON CONTAMINANTS.

No Drawing. Application filed March 27, 1925. Serial No. 18,887.

My invention relates to the purification of salts crystallized from ferric or ferrous sulphates.

In certain prior processes siliceous minerals, such as greensand, containing oxides of iron, aluminum and potash are treated with sulphuric acid, and, after the metallic ingredients have been sulphatized and dissolved and the solution has been separated from the siliceous residue, potash alum has been obtained therefrom either directly by crystallization from the solution or in other ways. Where this potash alum is contaminated with ferric or ferrous sulphate, or both, as is very markedly the case where it is crystallized from a mixed ferric or ferrous sulphate solution, it has been a very difficult and expensive matter to remove the iron contaminant to the desired extent. If the potash alum is to be further treated for the production of alumina for the manufacture of aluminum, it is extremely important that the iron content shall be almost nil.

When the potash alum crystallizes out of the iron sulphate solution, some of the solution adheres to the crystals and has to be washed off. This should be done with a minimum amount of water as the washing process also dissolves and therefore wastes some of the potash alum, while washing off the iron sulphate.

I have discovered that the removal of the iron contaminant is rendered very much easier and, therefore, more economical and effective by converting the ferric or ferrous sulphate present into a ferric or ferrous chloride, and this I have found can economically be done through reaction with common salt. For a further explanation of my invention I will describe the purification of potash alum obtained by crystallization from a ferric sulphate solution.

These potash alum crystals carry a considerable quantity of the ferric sulphate solution from which they were crystallized. Hitherto the methods in vogue to remove this ferric sulphate contaminant have involved a washing of the crystals with water, during several recrystallizations. It has been found that by these methods it was impossible to obtain the desired purity without so many recrystallizations as to much increase the expense of the process. On the other hand, I find that by washing the crystals with a common salt solution which converts the ferric sulphate present into ferric chloride (and in the case of ferrous sulphate, into ferrous chloride) it becomes very easy to wash off the iron salt from the crystals. If still further purification is desired, redissolving the impure crystals in an aqueous solution to which a little common salt has been added, followed by a recrystallization will remove the last trace of iron. As the iron sulphate is present in very small amount, the amount of salt needed for its conversion to a chloride is also very small, and as it is a relatively cheap ingredient, the cost of this step of the process is low.

These marked effects result from converting the ferric or ferrous sulphate into the corresponding chloride which is much more soluble than the sulphate. They are also partly due to the fact that ferric sulphate tends rapidly to hydrolize and decompose when acted upon by water, and thereby develops fine precipitates which tend to largely remain with the potash alum during crystallization, or to adhere firmly to it during washing, and partly to the fact that the nature of the ferric or ferrous sulphate solution is such that it adheres more firmly to the potash alum crystals than does the corresponding chloride solution, hence is not so thoroughly washed off.

Although I have described my invention more specifically in connection with potash alum crystallized out from a solution of iron or an iron sulphate, yet I do not want from the standpoint of my broader claims, to be limited to this precise salt or to salt produced by crystallization.

Having thus described my invention, what I claim and desire to secure by Letters Patent is:

1. The method of treating crystals contaminated with an adhering iron sulphate which consists in converting the iron sulphate into iron chloride thereby rendering the iron contaminant more readily separable.

2. The method as set forth in claim 1 where the conversion from sulphate to chloride is effected by reaction with common salt in solution.

3. The method of producing substantially iron free potash alum which consists in crystallizing out potash alum from a solution containing potassium, aluminum and iron sulphates, washing the crystals with a chloride solution to convert the iron contaminant to a chloride, and then washing the crystals with water to remove the iron chloride.

In testimony whereof, I have signed my name to this specification.

HARRY P. BASSETT.